3,536,714
SUBSTITUTED LOWERALKYLTHIO IMIDAZO-
LINES, TETRAHYDRO PYRIMIDINES AND
TETRAHYDRODIAZEPINES
Marcel K. Eberle, Madison, N.J., assignor to
Sandoz Inc., Hanover, N.J.
No Drawing. Filed Nov. 1, 1967, Ser. No. 679,635
Int. Cl. C07d 49/34, 51/34
U.S. Cl. 260—256.5                                    9 Claims

ABSTRACT OF THE DISCLOSURE

This disclosure pertains to certain 2-loweralkylthio-2-imidazolines, 2-loweralkylthio tetrahydropyrimidines and 2-loweralkylthio tetrahydrodiazepines, e.g., 2-methylthio-1-(3'-pyridinoyl)-2-imidazoline. The compounds are useful as anti-inflammatory agents.

---

This invention relates to novel heterocyclic compounds. In particular, this invention pertains to 1-substituted-2-loweralkylthioimidazolines, tetrahydro pyrimidines and tetrahydrodiazepines and to methods for preparing them.

The novel heterocyclic compounds of the present invention may be represented by the following structural formula:

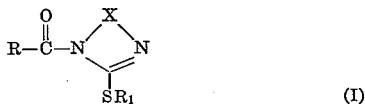

where

R represents phenyl, bromophenyl, 2(4'-chlorobenzoyl) phenyl or pyridyl;
$R_1$ represents lower alkyl; and
X represents $(CH_2)_n$ where $n$ is 2 to 4.

The lower alkyl groups represented by $R_1$ may be alkyl radicals having 1 to 4 carbon atoms, e.g., methyl, ethyl, isopropyl, butyl and the like, whereas the pyridyl group present at the R position may be a 2-pyridyl, 3-pyridyl or 4-pyridyl radical.

The compounds of Formula I above may be prepared by treating a carbonyl halide with a N-containing heterocyclic group substituted at the 2-position with a loweralkylthio substituent. The process for preparing the imidazolines, tetrahydropyrimidines and tetrahydrodiazepines (I) may be represented by the following reaction:

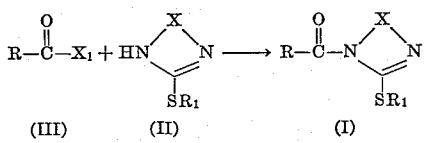

where R, $R_1$ and X are as defined above, and $X_1$ is chloro or bromo.

In accordance with the above process, the compounds of Formula I are prepared by treating the carbonyl halide designated Formula III with a loweralkylthio imidazoline, pyrimidine or diazepine of Formula II in a solvent such as ether, water, dimethylformamide, lower alkanols such as methanol, ethanol, and the like, chlorinated hydrocarbons, e.g., methylene chloride and carbon tetrachloride, or mixtures thereof. The reaction is conducted at temperatures of about −20° C. to 80° C. and is preferably conducted at about 0° C. to about room temperature for about ½ to 24 hours. Solvent need not be present and neither the particular solvent used, nor the temperature of reaction is critical in obtaining the compounds of this invention. The resulting products (I) are recovered utilizing conventional recovery techniques such as recrystallization, filtration and the like. It is preferred in the above process to take up available hydrogen halide by use of an organic base, and pyridine may be used for this purpose.

Various of the carbonyl halides (III) and imidazolines, tetrahydropyrimidines and tetrahydrodiazepines of Formula II are known and may be prepared according to methods disclosed in the literature. Those compounds of Formulas II and III not specifically disclosed in the literature may be prepared from available materials in an analogous manner.

The compounds of Formula III where R is 2-(p-chlorobenzoyl) phenyl also exist as tautomers thereof which may be represented by the following formula:

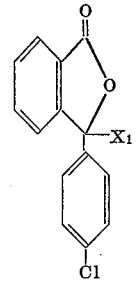

where $X_1$ is as previously defined. In order to simplify this description, however, this compound will also be represented in the form indicated according to Formula III although it should be understood either of the tautomeric forms may be represented as well and that both are intended to be embraced by the present invention.

The imidazolines, tetrahydropyrimidines and tetrahydrodiazepines of Formula I are useful because they possess pharmaceutical properties in animals. In particular, these compounds are useful as anti-inflammatory agents, as indicated by the carrogeenan-induced edema test on the white rat paw. When so utilized the compounds may be combined with one or more pharmaceutically acceptable carriers or adjuvants. They may be administered orally or parenterally, and depending upon the compound employed and the mode of administration, the exact dosage utilized may vary. In general, satisfactory results are obtained when these compounds are administered at a daily dosage of about 10 milligrams to about 250 milligrams per kilogram of animal body weight. This daily dosage is preferably administered 2 to 4 times a day, or in sustained release form. For most large mammals, the total daily dosage is from about 1000 milligrams to about 30,000 milligrams. Dosage forms suitable for internal use comprise from about 250 milligrams to about 1500 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
|---|---|
| 2 - methylthio - 1(3' - pyridinoyl) - 2 - imidazoline | 70 |
| Tragacanth | 2 |
| Lactose | 19.5 |
| Corn starch | 5 |
| Talcum | 3 |
| Magnesium stearate | 0.5 |

The following examples are provided for the purpose of illustration and not by way of limitation.

EXAMPLE 1

1-benzoyl-2-methylthio-2-imidazoline

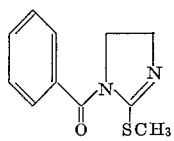

To an ice-cooled mixture of 50 ml. of methylene chloride, 11.6 g. of 2-methylthio imidazoline and 12 ml. of pyridine is added dropwise 14.1 g. of benzoylchloride. After the addition is completed, 100 ml. of methylenechloride is added. The mixture is stirred for 3 hours, poured on saturated sodium carbonate solution (50 ml.), extracted with ether (200 ml.) dried over sodium sulfate and evaporated. The resulting crystalline material is suspended in 20 ml. of ether and filtered through a silica gel column to provide 14 g. of 1-benzoyl-2-methylthio-2-imidazoline; M.P. 124° C.

When the above process is carried out and benzoyl bromide is utilized in place of benzoyl chloride, 1-benzoyl-2-methylthio-2-imidazoline is again produced.

EXAMPLE 2

1-(2'-bromobenzoyl)-2-methylthio-2-imidazoline

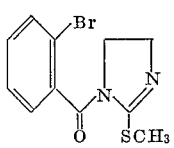

50-ml. of methylene chloride, 12 ml. of pyridine and 11 g. of 2-methylthioimidazoline are mixed and cooled in an ice bath. 22 g. of o-bromobenzoyl chloride is added dropwise. After completion of the addition, 100 ml. of methylene chloride is added. The mixture is stirred for three hours and poured onto saturated sodium carbonate solution (50 ml.). It is then extracted with ether (200 ml.), dried over sodium sulfate and evaporated. The resulting material is suspended in 20 ml. of ether and filtered through a silica gel column to provide 25 g. of relatively pure 1-(2'-bromobenzoyl) - 2 - methylthio-2-imidazoline; M.P. 102–103° C.

EXAMPLE 3

2-methylthio-1(3'-pyridinoyl)-2-imidazoline

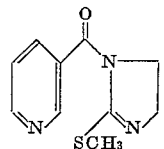

6 g. of nicotinic acid, 20 ml. of thionyl chloride and 5 drops of dimethylformamide (absolute) are mixed and maintained at about room temperature until a clear solution is obtained. The reaction mixture is evaporated to dryness under reduced pressure and the resulting crystalline acid chloride hydrochloride is added in small portions to an ice-cooled mixture of 50 ml. of methylene chloride, 5 g. of 2-methylthio imidazoline and 10 ml. of pyridine. Methylene chloride (100 ml.) is then added and the mixture is stirred for three hours. It is then poured onto saturated sodium carbonate solution (50 ml.), extracted with 200 ml. of ether, dried over sodium sulfate and evaporated to provide a crude product. This crude crystalline material is then recrystallized from acetone/hexane (1:1) to provide 3 g. of substantially pure 2-methylthio-1(3'-pyridinoyl)-2-imidazoline; M.P. 130 to 131° C.

EXAMPLE 4

2-methylthio-1(4'-pyridinoyl)-2-imidazoline

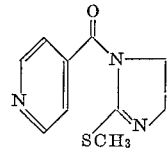

The acid chloride hydrochloride prepared from 20 g. of isonicotinic acid is added in small portions to an ice-cooled mixture containing 20 g. of 2-methylthio imidazole, 100 ml. of methylene chloride and 20 ml. of pyridine. The mixture is stirred for 3 hours, poured onto saturated sodium carbonate solution (50 ml.) and extracted with 200 ml. of ether. The resulting mixture is then dried over sodium sulfate and evaporated to provide 27 g. of crude product. This material is filtered through silica gel using benzene (50 ml.) to provide 18 g. of a crystalline material which upon recrystallization from 100 ml. of methylene chloride/hexane (1:1) yields 17 g. of substantially pure 2-methylthio-1(4'-pyridinoyl)-2-imidazoline: M.P. 100° to 101° C.

EXAMPLE 5

1-[2-(p-chlorobenzoyl)-benzoyl]-2-methylthio-2-imidazoline

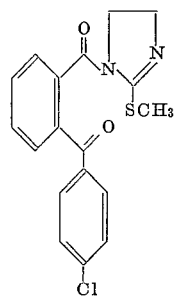

The acid chloride of 2-p-chlorobenzoyl benzoic acid (28 g.) dissolved in 100 ml. of methylene chloride is added to an ice-cooled solution of 10 ml. of pyridine, 11.6 g. of 2-methylthio imidazoline and 100 ml. of methylene chloride. After the addition is completed, the mixture is stirred for 3 hours, poured onto saturated sodium carbonate solution (50 ml.), extracted with 200 ml. of ether, dried over sodium sulfate and evaporated. The resulting crystalline material (44 g.) is then filtered through silica gel using 50 ml. of chloroform. After recrystallization from methylene chloride/pentane (1:1), 15 g. of crystalline 1-[2-(p-chlorobenzoyl)-benzoyl] - 2 - methylthio-2-imidazoline is obtained; M.P. 138–140° C. A similar result is obtained when dimethylformamide is used in place of pyridine in the above process.

EXAMPLE 6

2-methylthio-1(2'-pyridinoyl)-2-imidazoline

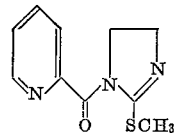

To the acid chloride of 2-picolinic acid (21 g.) in 25 ml. in benzene is added 13 g. of 2-methylthio imidazoline. The mixture is stirred vigorously for one hour and evaporated to dryness in vacuo. Methylene chloride (500 ml.) is added and the resulting solution is washed with 200 ml. of 2 N sodium carbonate, dried over sodium sulfate and evaporated. The residue is dissolved in 50 ml. of chloroform and filtered through a silica gel column. The filtrate is evaporated and the remaining product is recrystallized from acetone/hexane (1:1) to provide 5.2 g. of 2-methylthio-1(2'-pyridinoyl)-2-imidazoline; M.P. 104° C.

EXAMPLE 7

2-methylthio-1(3'-pyridinoyl)-1,4,5,6-tetrahydropyrimidine

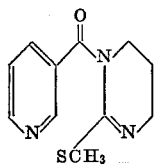

Nicotinic acid chloride hydrochloride (20.4 g.) is added slowly to an ice cooled mixture of 15 g. of 2-methylthio-3,4,5,6-tetrahydropyrimidine, 15 ml. of pyridine and 100 ml. of methylene chloride. The reaction mixture is stirred at room temperature overnight, poured onto saturated sodium carbonate solution (50 ml.), extracted with ether (200 ml.), dried over sodium sulfate and evaporated. The resulting crystalline material is filtered through silica gel with 50 ml. of chloroform to provide 15 g. of 2-methylthio - 1(3' - pyridinoyl) - 1,4,5,6 - tetrahydropyrimidine; M.P. 79° C.

EXAMPLE 8

2-methylthio-4,5,6,7-tetrahydro-1(3'-pyridinoyl)-1H-1,3-diazepine

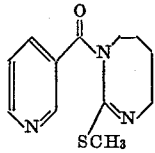

To an ice-cooled mixture containing 10.0 g. of 1,3-diazepine, 100 ml. methylene chloride, and 20 ml. pyridine is added 12.4 g. of nicotinic acid chloride hydrochloride in small portions. The reaction mixture is stirred at room temperature for 2 hours and refluxed for ½ hour. Methylene chloride (400 ml.) is added, and the mixture is washed with 200 ml. 2 N sodium carbonate and dried with evaporation under reduced pressure. The residue is treated with 200 ml. of benzene, filtered through a silica gel column and the crystalline product is recrystallized from ketone/hexane to provide 2-methylthio-4,5,6,7-tetrahydro-1-(3'-pyridinoyl)-1H-1,3-diazepine; M.P. 94–95° C.

What is claimed is:
1. A compound of the formula

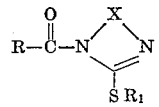

where
R represents phenyl, bromophenyl, 2(4'-chlorobenzoyl)phenyl or pyridyl;
$R_1$ represents lower alkyl; and
X represents $(CH_2)_n$ where $n$ is 2 to 4.

2. The compound of claim 1 which is 1-benzoyl-2-methylthio-2-imidazoline.
3. The compound of claim 1 which is 1-(2'-bromobenzoyl)-2-methylthio-2-imidazoline.
4. The compound of claim 1 which is 2-methylthio-1(3'-pyridinoyl)-2-imidazoline.
5. The compound of claim 1 which is 2-methylthio-1(4'-pyridinoyl)-2-imidazoline.
6. The compound of claim 1 which is 1-[2-(p-chlorobenzoyl)-benzoyl]-2-methylthio-2-imidazoline.
7. The compound of claim 1 which is 2-methylthio-1-(2'-pyridinoyl)-2-imidazoline.
8. The compound of claim 1 which is 2-methylthio-1-(3'-pyridinoyl)-1,4,5,6-tetrahydropyrimidine.
9. The compound of claim 1 which is 2-methylthio-4,5,6,7-tetrahydro-1-(3'-pyridinoyl)-1H-1,3-diazepine.

References Cited

UNITED STATES PATENTS

| | | | |
|---|---|---|---|
| 2,921,073 | 1/1960 | Conover et al. | 260—256.5 |
| 3,168,520 | 2/1965 | Kleemann et al. | 260—256.4 |
| 3,251,854 | 5/1966 | Sims | 260—309.6 |

ALEX MAZEL, Primary Examiner

R. J. GALLAGHER, Assistant Examiner

U.S. Cl. X.R.

260—239, 251, 294.8, 309.6, 343.3; 424—244, 251, 263, 273